United States Patent [19]

Umeda et al.

[11] Patent Number: 4,747,149
[45] Date of Patent: May 24, 1988

[54] OPTICAL CHARACTER RECOGNITION APPARATUS

[75] Inventors: Tetsuo Umeda; Shigenobu Kasuya, both of Tokyo, Japan

[73] Assignee: NEC Corporation, Tokyo, Japan

[21] Appl. No.: 26,890

[22] Filed: Mar. 17, 1987

[30] Foreign Application Priority Data

Mar. 17, 1986 [JP] Japan .................................. 61-58585

[51] Int. Cl.$^4$ ................................................ G06K 9/36
[52] U.S. Cl. ........................................ 382/18; 382/51
[58] Field of Search .............................. 382/18, 51, 54; 358/282, 284

[56] References Cited

U.S. PATENT DOCUMENTS 3,466,603  9/1969  Shelton ................................. 382/51
4,254,400  3/1981  Yoda et al. ............................ 382/18
4,601,057  7/1986  Tsuji et al. ............................ 382/51

Primary Examiner—Leo H. Boudreau
Attorney, Agent, or Firm—Leydig, Voit & Mayer

[57] ABSTRACT

The disclosure describes a character recognition apparatus comprising a scanner for optically scanning a prescribed area and outputting a scanned signal, a binary processing circuit for receiving the scanned signal and producing a plurality of binary signals, a counting mechanism for counting black meshes in the scanned area, a counting mechanism for counting insulated meshes, a mechanism for calculating the ratio of the number of black meshes and the number of insulated meshes, and a mechanism for selecting one optimum binary signal from the plurality of binary signals on the basis of a comparison of the ratios.

5 Claims, 3 Drawing Sheets

OPTICAL CHARACTER RECOGNITION APPARATUS

BACKGROUND OF THE INVENTION

The present invention relates to an optical character recognition apparatus which optically scans characters such as a letter and a mark written on a mail article and performs character recognition based on a scanned signal.

In an optical character recognition apparatus, a character is recognized in such a manner that the character is scanned optically and a binary signal is produced from the scanned signal by slicing the scanned signal by a threshold level. Then, distinctive features of the character are extracted from the binary signal and are compared with reference features. In the binary signal processing, optimization of setting of the threshold level is conducted to improve a recognition rate. Further, to this end, filtering processes such as thinning, gradating and emphasizing processes are also conducted to produce a effective binary signal.

In the case of a mail article as an object to be read, however, a character is frequently written or printed in various conditions, for example, in a variety of brightness and color of a background and in a variety of printed condition of strong to weak. In the case of the mail article, in addition, when a paper constructing the mail article is thin, another character and mark printed in an interior are sometimes picked up by a scanner through such thin paper. Therefore, it is difficult in this case to set an optimum threshold level and to perform an optimum filtering process irrespective of a various object to be read, and thus, the recognition rate can not be sufficiently improved. Namely, when the threshold level and the filtering process are set so as to sufficiently read a weakly printed/written character, for instance, the recognition rate becomes lower since a pattern other than the character is picked up and it becomes a noise in the binary signal. To the contrary, when the threshold level and the filtering process are set so as not to extract the pattern other than the character, a weakly printed written character can not be recognized. As above stated, it is difficult heretofore to increase the recognition rate sufficiently when the mail article having various printing conditions is scanned.

SUMMARY OF THE INVENTION

It is, therefore, an object to provide an optical character recognition apparatus which can recognize a character correctly even when the conditions of the character and the background are various.

According to the present invention, there is provided a character recognition apparatus which comprises a scanner for optically scanning a prescribed scanning area and outputting a scanned signal corresponding to a character contained in the scanning area, a binary processing circuit receiving the scanned signal from the scanner for producing a plurality of binary signals different in a characteristic by means of alteration of a threshold level and/or a filtering process, a black mesh number counting means for counting black meshes in the scanning area with respect to the plurality of the binary signals when the scanning area is represented by a large number of meshes and when the binary signals are represented in each mesh by black showing a part of a character and by white showing a background other than the character or the mark, an insulated mesh counting means for counting insulated meshes each being a white mesh surrounded by black meshes and a black mesh surrounded by white meshes with respect to the plurality of the binary signals, an ratio calculating means for calculating ratios of the number of black meshes with that of the insulated meshes with respect to the plurality of the binary signals and a selecting means for selecting one optimum binary signal from the plurality of the binary signals on the basis of comparison of the ratios. Accordingly, a recognition processing is performed on the basis of the selected optimum binary signal.

DESCRIPTION OF PREFERRED EMBODIMENTS

Figure 1:
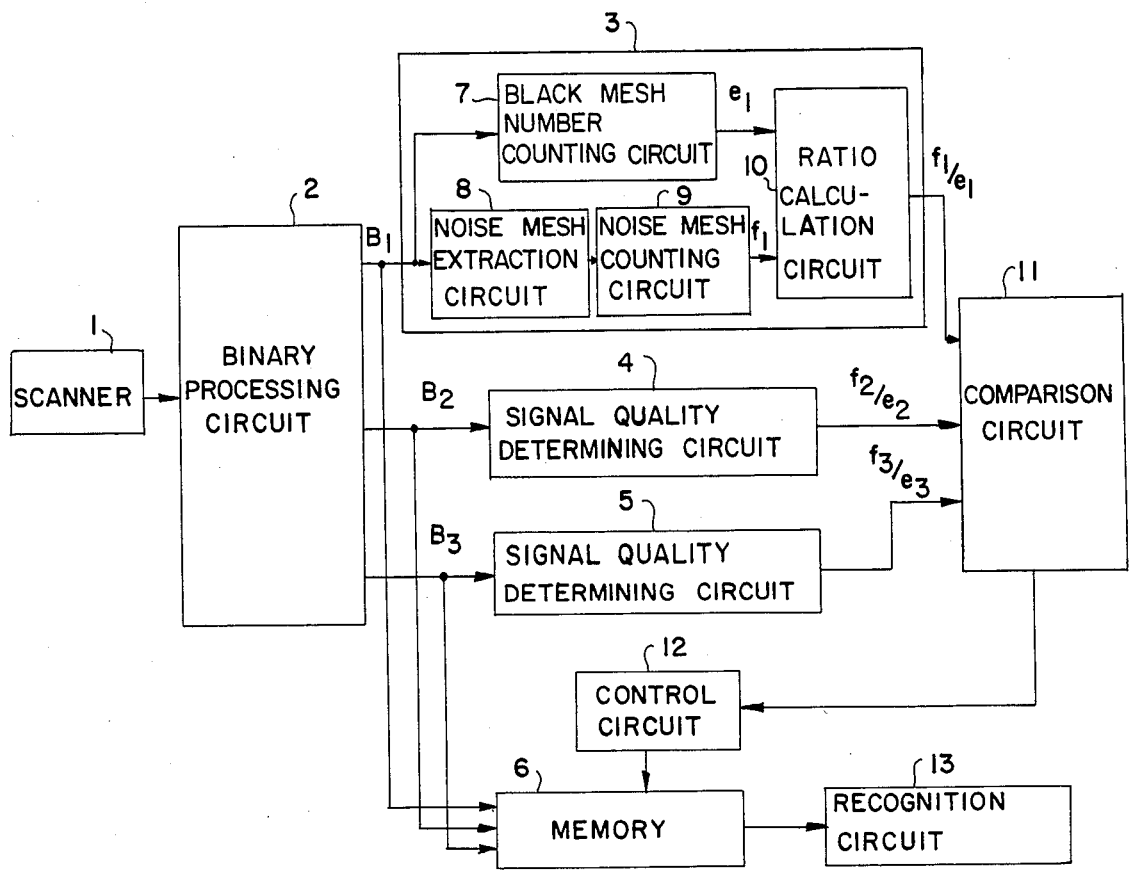
FIG. 1 is a block diagram of a first embodiment according to the present invention.

In FIG. 1 showing a first embodiment of the present invention, a scanner 1 scans a scanning area having a predetermined dimension of a mail article, and a scanned signal is supplied to a binary processing circuit 2. In the binary processing circuit 2, the scanned signal supplied from the scanner 1 is sliced by different threshold levels or subjected to different filtering processes to form a plurality of binary signals $B_1$, $B_2$ and $B_3$ having respective different characteristics. Then, the binary signals $B_1$, $B_2$ and $B_3$ are supplied to signal quality determination circuits 3, 4 and 5, respectively. These binary signals $B_1$ to $B_3$ are quantized. It is assumed that the scanning area scanned by the scanner 1 is represented by 100×200 meshes, for instance, each mesh being black showing a part of a character or white showing a background. On the other hand, these binary signals $B_1$, $B_2$ and $B_3$ are supplied to a memory 6 and stored therein. The signal quality determination circuit 3, 4 and 5 have the same construction and each of them comprises a black mesh number counting circuit 7, an insulated (noise) mesh extraction circuit 8, a noise mesh counting circuit 9 and a ratio calculation circuit 10.

The black mesh number counting circuit 7 receiving the binary signal B counts black meshes in the scanning area, and delivers the black mesh number e to the ratio calculation circuit 10. The noise mesh extraction circuit 8 receives the binary signal B and extracts an insulated (noise) mesh showing a central mesh alone different from surrounding ones in a region of some dimensions, e.g. a region of 3×3 meshes or 5×5 meshes. For instance, a case wherein meshes surrounding a central white mesh are all black, as well as a case wherein meshes sorrounding a central black mesh are all white, are to be extracted. In the present application, such the insulated mesh as stated above is dealt with as noise. The construction of the insulated mesh extraction circuit 8 will be described later in detail.

The output of the insulated mesh extraction circuit 8 is sent to the noise mesh counting circuit 9, wherein the number of insulated meshes in the scanning area is counted and the noise mesh number (f) is sent to the ratio calculation circuit 10. The ratio calculation circuit 10 receives the number (e) from the black mesh number counting circuit 7 and the number (f) from the noise mesh counting circuit 9 and calculates an evaluation ratio (f/e). In an optical character recognition apparatus, in general, the accuracy and stability of a recognition process increase as the aforementioned insulated (noise) meshes decrease and, accordingly, the evaluation ratio (f/e) can be applied to determine one binary signal being more appropriate for the recognition process.

Now, it is assumed that two mail articles P and Q will be taken as examples. In the mail article P, depth gradation of print of character is small, while, in the mail article Q constructed of a thin paper, another character or mask printed at the back face is seen through. A description will be made on the adaptation of the present invention to these cases, citing the formation of two binary signals produced by two different threshold levels, i.e., high and low threshold levels. In the case of the mail article P, the signal quality of the binary signal is improved as the threshold level is lowered. To the contrary, if the threshold level becomes high, a binary signal produced thereby becomes to have blur. For instance, the number $e_1$ of black meshes is 1200 and the number $f_1$ of insulated (noise) meshes is 100 in the case where the scanning area of a scanner is of 100×200 meshes and when a threshold level is low. When the threshold level is raised in this case, the number $e_2$ of black meshes turns to be 800 while the number $f_2$ of noise meshes turns to be 200. On the occasion, an evaluation ratio $f_1/e_1$ is 100/1200 and an evaluation ratio $f_2/e_2$ is (200/800) ($f_1/e_1 < f_2/e_2$). Accordingly, it is found from the comparison between the evaluation ratios that the binary signal with the lower threshold level is effective for better recognition processing.

In the case of the mail article Q, it is effective as the threshold level is raised because the character and mark printed at the back face are also included in the binary signal as noise if the threshold level is low. For instance, the number $e_1$ of black meshes is 2400 and the number $f_1$ of noise meshes 500 when the threshold level is low. When the threshold level is made high, the number $e_2$ of black meshes turns to be 1500 while the number $f_2$ of noise meshes turns to be 100. On the occasion, the evaluation ratio $f_1/e_1$ is 500/2400 $f_2/e_2$ is (100/1500)($f_1/e_1 > f_2/e_2$). Accordingly, it is found from the comparison between the evaluation ratios that the binary signal with the higher threshold level results in better recognition processing.

Now turning back to FIG. 1, the signal quality determination circuits 3, 4 and 5 deliver, consequently, evaluation ratios ($f_1/e_1$, $f_2/e_2$, $f_3/e_3$) with respect to a plurality of three binary signals $B_1$, $B_2$ and $B_3$, and send these ratios to a comparison circuit 11. The comparison circuit 11 compares three evaluation ratios $f_1/e_1$, $f_2/e_2$ and $f_3/e_3$ and delivers a selection signal to select one binary signal having the smallest evaluation ratio to a control circuit 12. Based on the selection signal sent from the comparison circuit 11, the control circuit 12 reads out the binary signal having the smallest evaluation ratio from the memory 6, and sends it to a recognition circuit 13. Based on the binary signal read out of the memory 6, the recognition circuit 13 conducts recognition of the scanned character.

Figure 2:
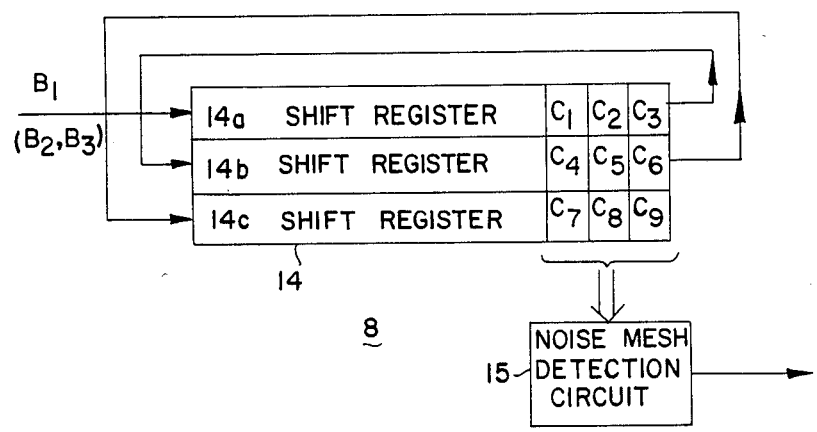
FIG. 2 is a block diagram of an insulated mesh extracting circuit in FIG. 1.

FIG. 2 shows a detailed block diagram of the insulated mesh extraction circuit 8 of FIG. 1. In the embodiment, the insulated mesh is extracted under the condition of a region of 3×3 meshes. In FIG. 2, the input binary signal $B_1$(Bhd 2, $B_3$) is supplied to a register section 14. This register section 14 is composed of shift registers $14_a$, $14_b$ and $14_c$ having stages in the number corresponding to the number of meshes in the horizontal direction of the scanning area, and these registers are so arranged that the binary signal entering the left end of the shift register $14_a$ is shifted to the right while an output from the right end thereof turns to be an input of the subsequent shift register $14_b$ and that an output of the shift register $14_b$ turns likewise to be an input of the shift register $14_c$. Then, as shown in the figure, since stage signals $C_1$ to $C_9$ corresponding to 3×3 meshes are taken out of the respective consecutive three stages in the shift registers $14_a$, $14_b$ and $14_c$ and supplied to an insulated (noise) mesh detection circuit 15. In response to the nine stage signals $C_1$ to $C_9$, the detection circuit 15 takes a logic output D as shown in the following equation. The detection output thereof signifies the detection of the insulated mesh.

$$D = C_1 \cdot C_2 \cdot C_3 \cdot C_4 \cdot \overline{C}_5 \cdot C_6 \cdot C_7 \cdot C_8 \cdot C_9 + \overline{C}_1 \cdot \overline{C}_2 \cdot \overline{C}_3 \cdot \overline{C}_4 \cdot C_5 \cdot \overline{C}_6 \cdot \overline{C}_7 \cdot \overline{C}_8 \cdot \overline{C}_9 \tag{1}$$

Figure 6:
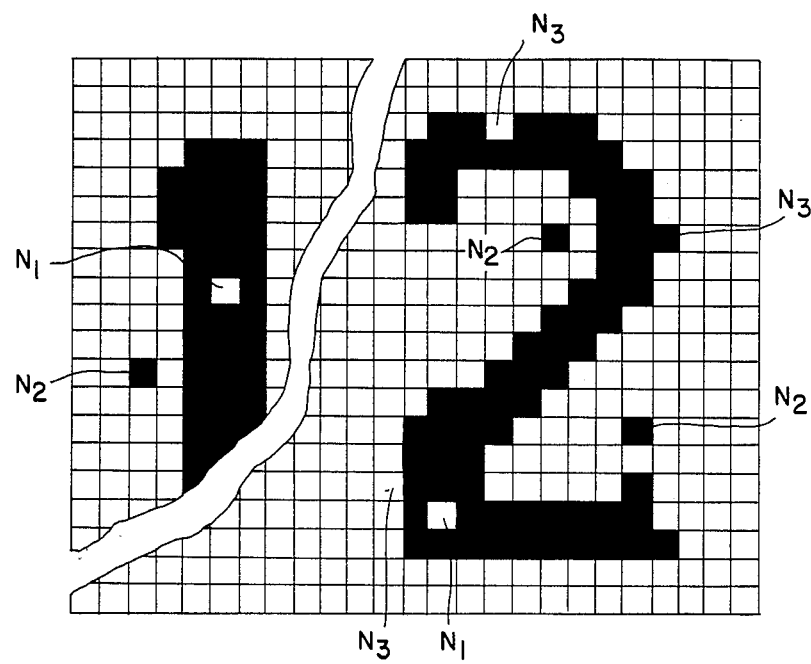
FIG. 6 shows a example of quantized meshes corresponding to a binary signal.

In the equation (1), the mark $\overline{C}$ denotes an inverted output, and when "1" of the binary signal B denotes a black mesh and "0" thereof a white mesh, the former term of the equation signifies the detection of the insulated mesh of the white mesh surrounded by black meshes which is indicated by $N_1$ in FIG. 6, while the latter term thereof signifies the detection of the insulated mesh of the black mesh surrounded by white meshes which is indicated by $N_2$ in FIG. 6. FIG. 6 shows an example of binary signal constructed of a mesh matrix.

Figure 3:
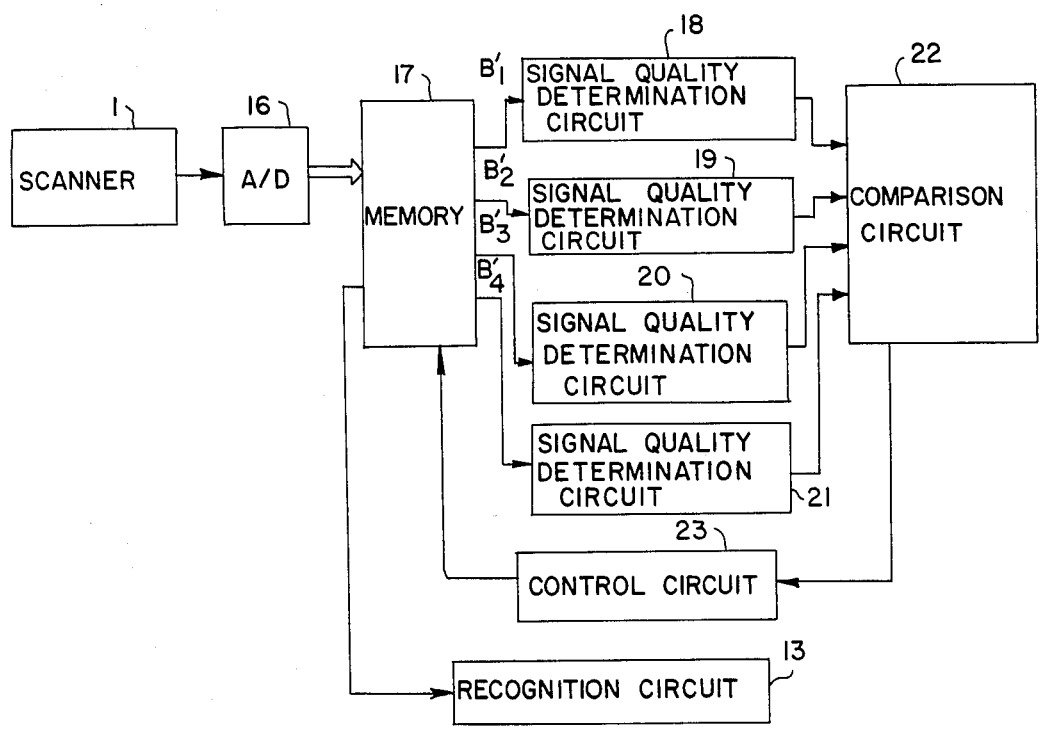
FIG. 3 is a block diagram of a second embodiment according to the present invention.

FIG. 3 shows a second embodiment of the present invention. In this figure, a scanned signal from a scanner 1 therein is converted into a multiple-leveled (n bits) digital signal by an A/D converter 16. When this digital signal delivered from the A/D converter 16 is represented by the multi-valued signal of n bits, most significant (m≦n) bits from the MSB are stored a memory 17. Respective m bits from the digital signal of n bits are to represent herein m binary signals which are produced by different threshold levels from one another, respectively. Next, the binary signals $B_1'$, $B_2'$, $B_3'$ and $B_4'$ in the number of m (four in this embodiment) are read out of the memory 17 and sent to four signal quality determination circuits 18, 19, 20 and 21. The four signal quality determination circuits 18 to 21 have the same construction as the signal quality determination circuits 3, 4 and 5 of FIG. 1, and they deliver evaluation ratios (f/e) with respect to the four binary signals $B_1'$ to $B_4'$ and transmit them to a comparison circuit 22. The comparison circuit 22 compares the four evaluation ratios (f/e) to determine the samllest one, therefrom, and sends a selection signal to a control circuit 23 to select one binary signal B' corresponding to the smallest evaluated ratio. Based on this selection signal, the control circuit 23 reads a corresponding binary signal B' out of the memory 17 and supplies it to a recognition circuit 13.

Figure 4:
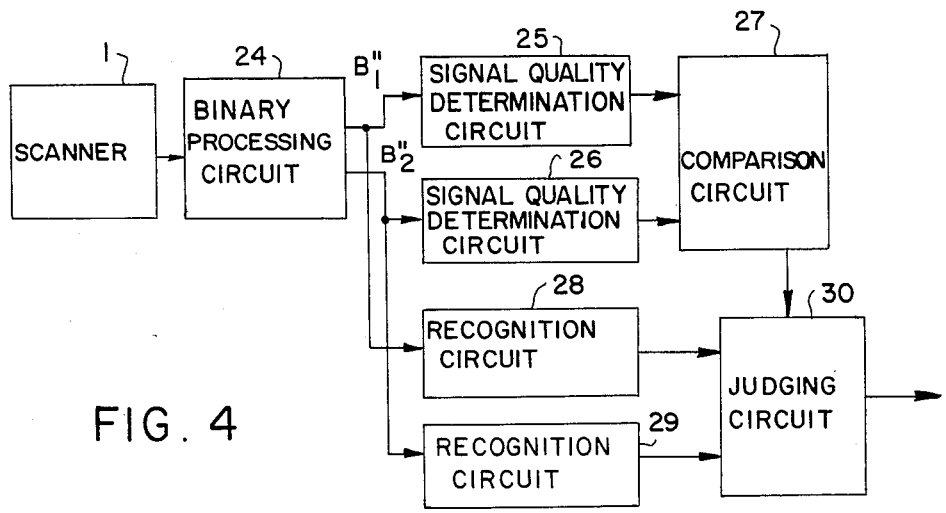
FIG. 4 is a block diagram of a third embodiment according to the present invention.

FIG. 4 shows a third embodiment of the present invention. In FIG. 4, a scanned signal from a scanner 1 is sent to a binary processing circuit 24, in which two binary signals $B_1'''$ and $B_2'''$ each having a different characteristic from other are formed. The two binary signals $B_1'''$ and $B_2'''$ are sent to signal quality determination circuits 25 and 26, in which evaluation ratios (f/e) are calculated. The determination circuits 25 and 26 also have the same construction as the determination circuits 3, 4 and 5 of FIG. 1. The evaluation ratios (f/e) outputted from the signal quality determination circuits 25 and 26 are sent to a comparison circuit 27, which outputs a selection signal to select one binary signal having the smallest evaluation ratio (f/e). The embodiment of FIG. 4 differs from that of FIG. 1 in that the two binary signals $B_1'''$ and $B_2'''$ from the binary processing circuit 24 are supplied to recognition circuits 28 and 29, respectively, in which recognition processing are performed on the basis of the respective binary signals. The recognition results are sent from the recognition circuits 28 and 29 to a judging circuit 30. The judging circuit 30 also receives the selection signal from the comparison circuit 27.

The judging circuit 30 operates in such a manner that, when the two recognition results delivered from the recognition circuits 28 and 29 are identical, this recognition result is determined as a final recognition result and that, when the two recognition results delivered from the recognition circuits 28 and 29 are different from each other, the recognition result corresponding to the binary signal having the smaller evaluation ratio (f/e) is determined as the final recognition result in response to the selection signal.

Figure 5:
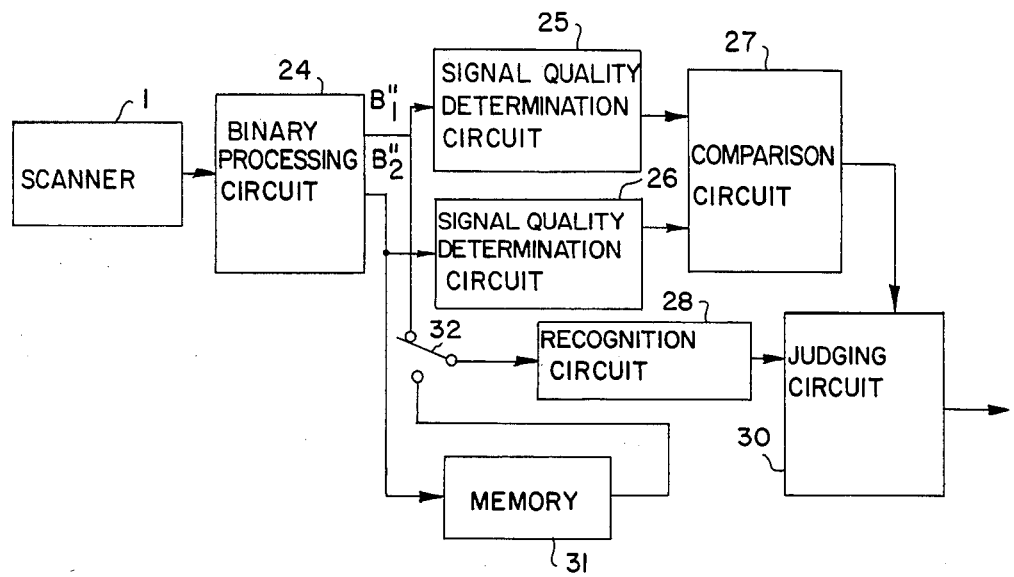
FIG. 5 is a block diagram of a fourth embodiment according to the present invention.

FIG. 5 shows a fourth embodiment of the present invention. This embodiment differs from that of FIG. 4 in that it has a single recognition circuit 28 and a memory 31 instead of another recognition circuit. The recognition circuit 28 first receives a binary signal $B_1'''$ through a switch 32 and performs a recognition processing on the basis of the binary signal $B_1'''$ so as to deliver the recognition result to a judging circuit 30. While the binary signal $B_1'''$ is subjected to the recognition processing, another binary signal $B_2'''$ is stored in the memory 31. After the recognition processing of the binary signal $B_1'''$, the binary signal $B_2'''$ is read out of the memory 31 and, then, supplied to the recognition circuit 28 through the switch 32, and the recognition processing of the binary signal $B_2'''$ is performed therein. This recognition result is sent to the judging circuit 30. The judging circuit 30 operates in the same way as that in the embodiment of FIG. 4.

Though the insulated mesh is dealt with as noise in the aforementioned embodiments, a projected mesh may also be extracted as a noise mesh. Such projected mesh is shown by a mesh $N_3$ in FIG. 6. A logic equation for extracting the projected mesh is as follows:

$$E = C_1 \cdot \overline{C_2} \cdot \overline{C_3} \cdot C_4 \cdot C_5 \cdot \overline{C_6} \cdot C_7 \cdot \overline{C_8} \cdot \overline{C_9} + \overline{C_1} \cdot C_2 \cdot \overline{C_3} \cdot C_4 \cdot \overline{C_5} \cdot \overline{C_6} \cdot C_7 \cdot C_8 \cdot \overline{C_9} \quad (2)$$

In the equation (2), the projected mesh of a black or white mesh in a region of 3×3 meshes is found in the horizontal direction. It is also possible to add a projected mesh in the vertical direction or others further thereto.

As above described, the present invention enables the selection of an optimum binary signal by counting the number of meshes of insulated meshes as noise, thus enabling an accurate, stable character recognition apparatus.

What is claimed is:

1. An optical character recognition apparatus comprising:
    means for optically scanning a prescribed scanning area to produce a scanned signal corresponding to a character contained in said prescribed scanning area;
    means responsive to said scanned signal for producing a plurality of binary signals each having a different characteristic, each binary signal being quantized to construct said prescribed scanning area of a plurality of meshes arranged to form a matrix and being represented by black meshes each indicating a part of said character and by white meshes each indicating a background;
    means for counting black meshes contained in said prescribed scanning area with respect to said plurality of binary signals to deliver a plurality of black mesh numbers corresponding to said plurality of binary signals, respectively;
    means for counting insulated meshes with respect to said plurality of binary signals to deliver a plurality of noise mesh numbers corresponding to said plurality of binary signals, said insulated mesh being a white mesh surrounded by black meshes and a black mesh surrounded by white meshes;
    means for calculating a plurality of ratios between said plurality of black mesh numbers and said plurality of noise mesh numbers, said plurality of ratios corresponding to said plurality of binary signals, respectively;
    means for determining an optimum binary signal from said plurality of binary signals on the basis of comparison of said plurality of ratios calculated by said calculating means; and
    means for recognizing said character contained in said prescribed scanning area on the basis of said optimum binary signal determined by said determining means.

2. An optical character recognition apparatus as claimed in claim 1, wherein said determining means includes:
    means for storing said plurality of binary signals,
    means for comparing said plurality of ratios with each other to produce a selection signal to select said optimum binary signal, and
    means for reading out said optimum binary signal from said storing means in response to said selection signal.

3. A character recognition apparatus comprising:
    means for scanning a predetermined scanning area to produce a scanned binary signal corresponding to a character contained in said predetermined scanning area;
    means for converting said scanned binary signal into a digital signal, said digital signal being constructed by a plurality of bits;
    means for producing a plurality of binary signals from said digital signal by selecting a plurality of bits constructing said digital signal, each binary signal being quantized to include a plurality of meshes arranged to form a matrix corresponding to said predetermined scanning area;
    means for counting black meshes each showing a part of a character contained in said predetermined scanning area with respect to said plurality of binary signals to deliver a plurality of black mesh numbers corresponding to said plurality of binary signals, respectively;

means for counting insulated meshes contained in said predetermined scanning area with respect to said plurality of binary signals to deliver a plurality of insulated mesh numbers corresponding to said plurality of binary signals, said insulated mesh being a black mesh surrounded by white meshes and a white mesh surrounded by black meshes, said white mesh showing other than said part of said character;

means for calculating a plurality of ratios between said plurality of black mesh numbers and said plurality of insulated mesh numbers, respectively;

means for comparing said plurality of ratios with each other to select one binary signal from said plurality of binary signals in accordance with the comparison result; and means for recognizing said character contained in said predetermined scanning area in response to said one binary signal delivered from said comparing means.

4. A character recognition apparatus comprising:

means for scanning a character on a mail article with a predetermined scanning area to produce a scanned signal;

means coupled to said scanning means for producing a plurality of binary signals from said scanned signal, said plurality of binary signals being binary-coded under respective different conditions, each of said binary signals being quantized to construct said predetermined scanning area of a plurality of meshes arranged in a matrix form and being represented by black meshes each indicating a part of a character and by white meshes other than said black mesh;

means for recognizing said character on said mail article on the basis of said plurality of binary signals to produce a plurality of recognition results corresponding to said plurality of binary signals, respectively;

means for counting said black meshes contained said predetermined scanning area with respect to said pluraltiy of binary signals to output a plurality of the numbers of black meshes corresponding to said plurality of binary signals, respectively;

means for counting noise meshes contained said predetermined scanning area with respect to said plurality of binary signals to output a plurality of the numbers of noise meshes corresponding to said plurality of binary signal, respectively, said noise mesh being a white mesh surrounded by black meshes and a black mesh surrounded by white meshes;

means for calculating a plurality of ratios between said plurality of the numbers of black meshes and said plurality of the numbers of noise meshes with respect to said plurality of binary signals;

means for selecting an optimum binary signal from said plurality of binary signals on the basis of said plurality of ratios calculated by said calculating means to deliver a selection signal corresponding to said optimum binary signal; and means responsive to said plurality of recognition results delivered from said recognizing means and said selection signal delivered from said selection means for determining a recognition output corresponding to said character.

5. A character recognition apparatus as claimed in claim 4, wherein said determining means determines said recognition output by selecting one from said plurality of recognition results in accordance with said selection signal when said plurality of recognition results are not identical with each other, said selected one corresponding to said optimum binary signal.

* * * * *